United States Patent [19]

Höfer et al.

[11] Patent Number: 4,628,957

[45] Date of Patent: Dec. 16, 1986

[54] PRESSURE VALVE FOR FUEL INJECTION PUMP

[75] Inventors: Gerald Höfer, Weissach-Flacht; Helmut Laufer, Stuttgart, both of Fed. Rep. of Germany

[73] Assignee: Robert Bosch GmbH, Stuttgart, Fed. Rep. of Germany

[21] Appl. No.: 675,332

[22] Filed: Nov. 27, 1984

[30] Foreign Application Priority Data

Dec. 12, 1983 [DE] Fed. Rep. of Germany ....... 3344825

[51] Int. Cl.[4] .............................................. F16K 17/26

[52] U.S. Cl. .............................. 137/493.3; 137/493.6; 123/467

[58] Field of Search ............... 137/493.3, 493.4, 493.5, 137/493.6, 512.2, 513.3; 123/467, 447, 506

[56] References Cited

U.S. PATENT DOCUMENTS

| | | | |
|---|---|---|---|
| 2,995,148 | 8/1961 | Novak et al. | 137/493.5 |
| 4,280,529 | 7/1981 | Silvestri | 137/493.3 |
| 4,478,189 | 10/1984 | Fenne | 123/467 |
| 4,498,499 | 2/1985 | Knorreck et al. | 137/513.5 |

FOREIGN PATENT DOCUMENTS

| | | | |
|---|---|---|---|
| 1083660 | 6/1960 | Fed. Rep. of Germany | 137/493.3 |
| 1289359 | 2/1969 | Fed. Rep. of Germany | 123/467 |
| 3112100 | 9/1982 | Fed. Rep. of Germany | . |

*Primary Examiner*—Martin P. Schwadron
*Assistant Examiner*—Sheri M. Novack
*Attorney, Agent, or Firm*—Michael J. Striker

[57] ABSTRACT

Disclosed is a pressure valve connectable between a fuel injection pump and the fuel injection valve of an internal combustion engine. The valve includes a cylindrical valve closing member which moves due to the pressure of fuel from the pump and expells a quantity of fuel to the injection valve. A throttling passage is provided as a bypass to the closing member and guarantees a stable pressure in the fuel supply conduit when the closing member is in open position. To neutralize reflected pressure waves in the supply conduit after injection the valve closing body is delayed by the throttling passage during its return movement into closing position. In addition, a check valve is arranged in the closing member which controls the stable pressure to a desired value.

4 Claims, 2 Drawing Figures

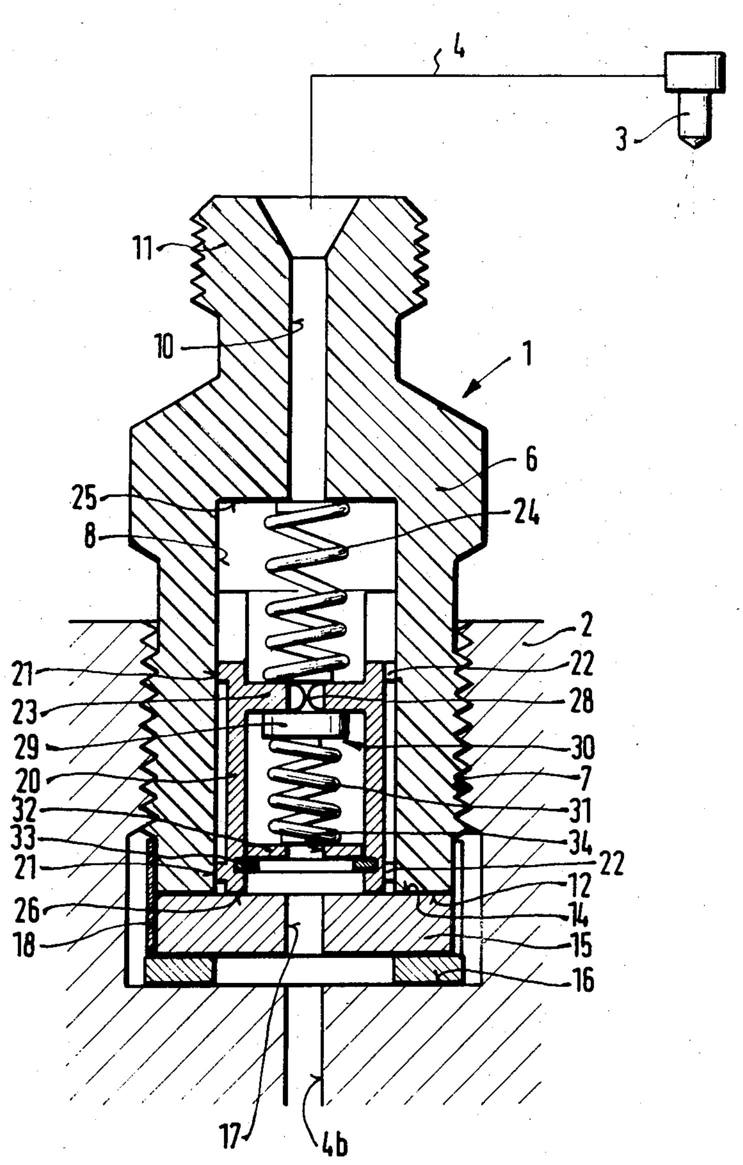
4
3
11
10
1
6
25
24
8
2
21
22
23
28
29
30
20
7
32
31
33
34
21
22
12
26
14
18
15
16
17
4b

PRESSURE VALVE FOR FUEL INJECTION PUMP

BACKGROUND OF THE INVENTION

The invention relates in general to a pressure valve for use in fuel injection system of a motor vehicle, and in particular, to a pressure valve of the type which includes a connecting adapter or socket arranged between a work space of a fuel injection pump and an injection valve of an internal combustion engine.

A pressure valve of this kind has been described in German publication No. 3,112,100. This known pressure valve includes a disc or plate acting as a valve closing member, the disc being provided with an annular web acting as a valve seat which abuts against a plate shaped valve body. During the supply of fuel the valve closing member separates the pump side of the supply conduit from the injection valve. The valve closing member moves against the force of a resetting spring by a distance which when multiplied by the area of the valve closing member determines the volume of injected fuel less the volume flowing on the circumference of the valve body. During the injection interruption the valve closing member by the action of the resetting spring returns gradually to its seat on the valve body whereby the volume of fuel expelled during this return movement flows partially through a throttling passage which is formed between the valve body and the wall of the closing member.

The disc-shaped valve closing member of this kind however, has the disadvantage that it slants easily and under circumstances it can be become clamped. Moreover, there may occur also an irregular impact of the annular web on the valve seat formed by the valve body, especially when the valve closing member is not exactly guided in the radial plane. Furthermore, the prior art valve does not guarantee that after completion of the fuel supply the corresponding fuel injection valve is not momentarily opened by pressure waves reflected between the pressure valve and the injection valve. In this manner an undesired additional injection of fuel may occur. Provided that the cross-section of the throttling area on the valve closing member is made so large that the pressure waves are quickly neutralized, it may still happen that the static pressure before the actual closing of the pressure valve drops to such an extent that exhaust gases from the combustion space of the engine may penetrate in the fuel injection system.

SUMMARY OF THE INVENTION

It is therefore a general object of the present invention to overcome the aforementioned disadvantages.

More particularly, it is an object of the invention to prevent the undesired additional injection of fuel due to pressure waves in the valve and simultaneously reliably maintain a static pressure in the fuel supply conduit to prevent penetration of exhaust gases from the combustion space of the engine into the supply conduit or in fuel system of the injection pump.

In keeping with these objects and others which will become apparent hereafter, one feature of the invention resides in the combination which comprises a connecting socket having an end face connectable to the work space of the injection pump, the end face being formed with an axial well having a bottom and a cylindrical wall, an axial throughbore connecting the bottom of the well to the supply conduit, an annular valve seat member insertable between the work space and the socket and sealingly engaging the end face thereof, a cylindrical valve closing member movable in opposite axial directions in the valve and having a central orifice and an end face sealingly engaging the valve seat member, a throttling passage formed between the valve closing member and the cylindrical wall of the valve, a resetting spring arranged between the bottom of the well and a valve closing member to urge the latter against the valve seat member, and a spring biased check valve arranged in the closing member opposite the central orifice to pass pressure waves from well toward the work space.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIG. 1 illustrates a sectional side view of the pressure valve of this invention;

FIG. 2 is a modification of the embodiment of FIG. 1.

DESCRIPTION OF PREFERRED EMBODIMENT

Pressure valve 1 is screwed at one end thereof into housing 2 of a fuel injection pump and at the other end thereof to a supply conduit 4 connecting via conduit portion **4*b* a non-illustrated work space of the injection pump to an injection valve 3 of a non-illustrated internal combustion engine. The pressure valve 1 includes a connecting adapter or socket 6 which is screwed in a threaded hole in the injection pump housing 2. The end face of the connecting socket adjoining the injection pump is formed with an axial well 8 opening toward the work space of the pump and having a cylindrical wall and a bottom. The bottom of the well 8 communicates via a through bore 10 with a schematically indicated supply conduit 4 which is connectable to a connecting nipple 11 at the outer end of the socket 6**.

The end face 12 of the socket 6 adjoining the injection pump engages a disc-shaped valve body 15 which rests on a step 16 at the bottom of the threaded blind bore in the pump housing 2. The valve body 15 has a central passage 17 connecting the axial well 8 with the supply conduit section **4*b*** leading to the non-illustrated work space of the injection pump.

The outer diameter of the valve body 15 equals to the outer diameter of the end face 12 of the connecting socket. Preferably, the valve body 15 and the connecting socket are connected to one another by an annular clip 18 holding the two parts together during transportation.

The valve closing member 20 is slidably arranged in the interior of the axial well 8. The valve closing member has a substantially cylindrical configuration and is provided on its outer jacket with guiding flanges 21 arranged in at least two axially spaced radial planes so that the valve closing member be exactly guided within the axial well 8. The guide flanges 22 are formed with throttling passages 22 between the wall of the well 8 and the closing member. The throttling passages connect the bottom part of the well 8 with the open part of the latter adjacent the valve body 15. The valve closing member 20 is in the form of a tubular piece provided with a partition 23 supporting a compression spring 24 whose other end engages the bottom 25 of the well 8. The compression spring 24 urges the valve closing member away from the bottom 25 of the well until the end face 25 of the closing member abuts on the valve body 15. The end face 26 of the closing member as well as the opposite end face 12 of the valve body are ground flat to serve as a sealing surface and as a valve seat 14, respectively.

In the center of the partition 23 of the closing member an orifice 28 is provided which is closeable from the side facing the injection pump by a disc-shaped or ball-shaped valve member 29 of a check valve 30. The check valve is spring-biased by a resetting spring 31 resting on an annular support 32 which rests on a retaining ring 33 attached to the inner wall the well 8. The annular spring support 33 has a central passage 34 which when the valve member 29 is displaced from its closing position, connects the supply conduit 4 to the conduit portion **4*b*** leading to the injection pump.

When during the operation of the fuel injection pump to which the pressure valve of this invention is connected, the fuel starts flowing through the supply conduit 4 to the internal combustion engine, then the pressure of the fuel liquid in the supply conduit **4*b* lifts the valve closing member 20 from its seat on the valve 15. During this lifting movement, the check valve 30 is biased by its resetting spring into its closing position and the pressure of fuel liquid acts on the valve member 29 in closing direction. As soon as the valve closing member 20 is displaced from its seat fuel starts flowing through the throttling passages 22 into the bottom part of the axial well 8 and simultaneously acts on the closing member 20 in supplying direction against the force of the resetting spring 24. During this movement a quantity of fuel is displaced and together with an additional quantity of fuel flowing in through the throttling passages 22 constitute the total metered quantity of fuel displaced in the supply conduit 4. The ratio of the two partial quantities of fuel can be determined by the size of the cross-section of the throttling passages 22. In adjusting the clearance of these passages it should be taken into account that the throttling cross-section must be at least of such a size that during the lifted condition of the closing member from its seat, the quantity of injected fuel and an additional quantity of the fuel establishing a static pressure in the supply conduit 4 between the pressure valve and the injection valve, could flow through the throttling passage. Essentially, however, the valve closing member 20** represents a separating piston, because the essential amount of fuel to be supplied for injection is conveyed by displacement of the valve closing member. During this displacement pressure loss of fuel during its flow through the throttling passage is kept very low and consequently maximum injection pressures can be obtained.

After the completion of the conveying cycle the valve closing member 20 is returned by the action of its resetting spring 24 into its initial position whereby fuel expelled during this return movement flows over through the throttling passages 22. The cross-section of the throttling passages determines the speed of the return movement of the closing member 20.

If reflected pressure waves start acting on the valve closing member after the closing of the injection valve 3 when the conveying process is completed, then such waves are quickly weakened by the return movement of the valve closing member 20. In addition, due to the reflected pressure waves the check valve 30 is opened and fuel can flow back through the orifice 28. Consequently, pressure peaks of the reflection pressure waves are further diminished. Fuel overflown during the resetting movement of the valve closing member is returned in a bypass through the throttling passages 22. The check valve 30 after abutment of the closing member on the valve body 16 becomes also effective and guarantees an exact static of stable pressure in the supply conduit 4 between the pressure valve 1 and the injection valve 3.

In order to prevent tilting of the valve closing body in the axial well 8, play between the guiding flanges 21 and the cylindrical wall of the well is as small as possible. As mentioned before, the guide flanges prevent the valve closing member from an oblique engagement with the valve body which might result in the destruction of the sealing seat. The cross-section of the throttling passage 22 which can be determined by making the outer diameter of the valve closing member smaller with respect to the diameter of the axial bore, can be also determined by axial throttling grooves as indicated in the Figure. The throttling grooves have the advantage that they permit very narrow and exact guide of the closing member.

In this example, the check valve 30 has a disc-shaped valve member 29. With advantage, the latter can be replaced by a ball-shaped valving member seated in an annular spring support acted upon by the biassing spring 31. The latter spring which in the example of FIG. 1 is supported directly on the valve closing member 20, can in another embodiment be replaced by a biasing spring 31' firmly supported on the valve body 15, as shown in FIG. 2. This alternative embodiment has the advantage that the opening pressure of the check valve 30 can be easily adjusted.

It will be understood that each of the elements described above, or two or more together, may also find a useful application in other types of constructions differing from the types described above.

While the invention has been illustrated and described as embodied in a specific example of a pressure valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure valve for use in a supply conduit between a work spaced of a fuel injection pump and a fuel injection valve of an internal combustion engine, comprising a connecting socket, an axial well formed in said socket and having a bottom and a cylindrical wall opening in an annular end face of the socket, an axial throughbore connecting said bottom of the well to a first part of the supply conduit leading to a fuel injection valve; an annular valve body insertable into a stepped bore in a second part of the supply conduit leading to a work space of a fuel injection pump; means for fastening said connecting socket in said stepped bore in a fixed position in which said annular end face of the socket firmly and sealingly engages a sealing face of said annular valve body; a tubular valve closing member movable in opposite axial directions in said well and including a partition provided with a central orifice; a resetting spring arranged between said bottom of the well and said partition to bias the valve closing member into a rest position in which said valve closing member sealingly engages said sealing face of the annular valve body; a throttling passage formed in said valve closing member opposite said cylindrical wall of the well; a check valve arranged in said valve closing member between said partition and said annular valve body, said check valve being spring biased against said partition to close said central orifice and to direct a flow of fuel from the fuel injection pump through said throttling passage when said tubular valve closing member is displaced from said rest position thereof, said check valve opening said orifice by the action of backpressure fuel waves to pass from said first part of the supply conduit through said orifice and said valve closing member into said second part of the supply conduit.

2. A pressure valve as defined in claim 1, wherein the check valve has a resetting spring supported on said valve closing member.

3. A pressure valve as defined in claim 1, wherein said check valve has a resetting spring supported on said annular valve body.

4. A pressure valve as defined in claim 1, wherein said check valve has a valve member forming together with the valve closing member a flat seat valve.

* * * * *